Figures 1, 2:
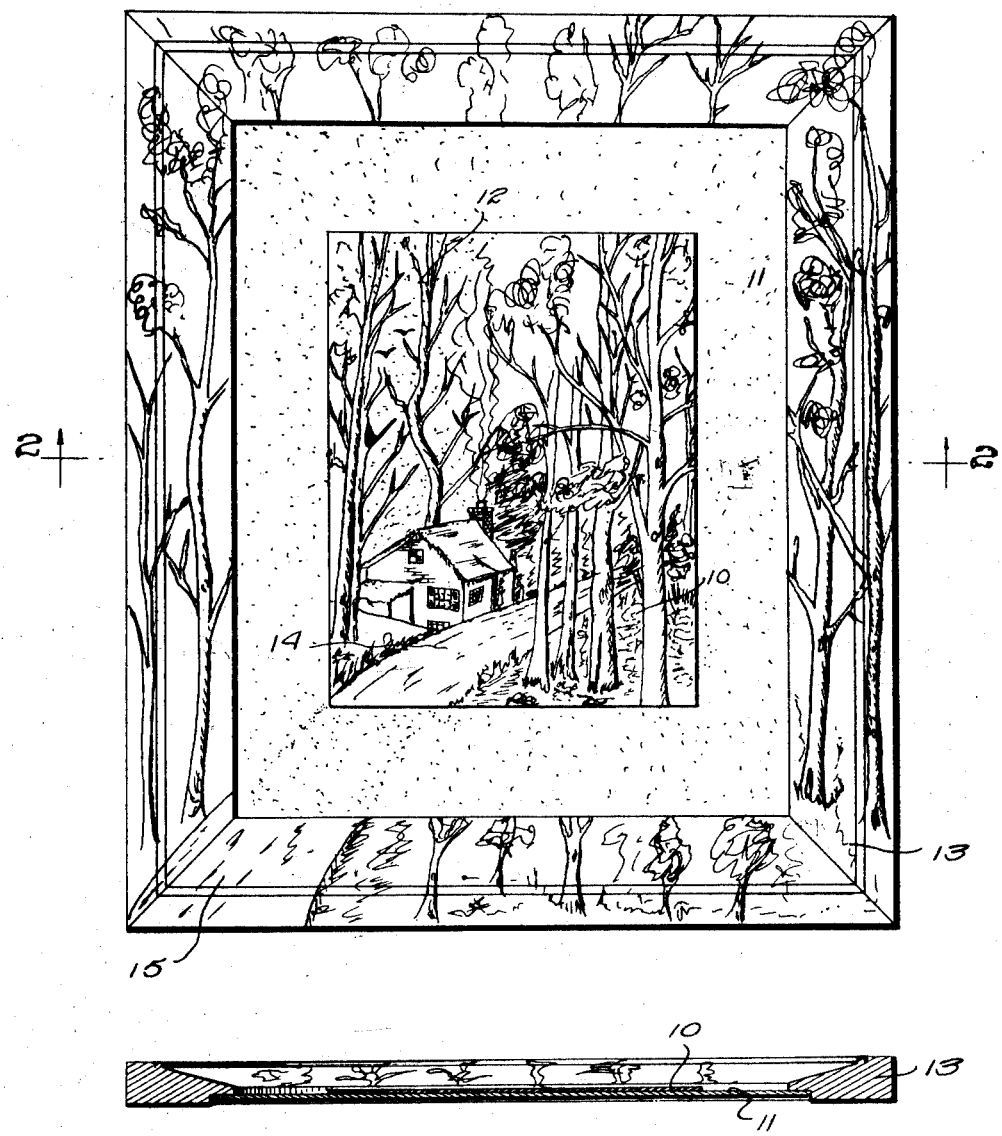

May 17, 1927.  
C. BALDWIN  
PICTURE  
Filed July 24, 1926

1,628,640

Inventor  
Carter Baldwin  
By  
C. H. Farley  
Attorney

Patented May 17, 1927.

1,628,640

UNITED STATES PATENT OFFICE.

CARTER BALDWIN, OF WILMINGTON, DELAWARE.

PICTURE.

Application filed July 24, 1926. Serial No. 124,749.

This invention relates to pictures, and more particularly to pictures in which a variety of colors is used.

The principal object of the invention is to provide means whereby a framed picture appears materially larger than its actual size and whereby a sense of pronounced perspective is created in the picture.

Heretofore pictures have been framed either with a mat corresponding only in general tone to the tone of the picture, or, omitting the mat, with a frame immediately surrounding the picture, the frame being plain or colored to preserve the general tone of the picture. Also it has been proposed to carry the pictorial effect of the picture on to a frame which immediately surrounds the picture in order to avoid the effect of sharp contrast between the picture and the frame.

I have discovered that by providing between a picture and its surrounding frame, a mat colored with one of the dominant colors of the picture immediately contiguous to said mat, or with the predominant color of the picture, or with several of the dominant colors of the picture contiguous to the mat, and by providing the frame with pictorial decorations corresponding to and suggesting a continuation of the picture there is produced an effect which has not heretofore been obtained.

In the accompanying drawings I have shown a preferred embodiment of the invention. In this showing, Figure 1 represents the completed picture, and Figure 2 is a section on line 2—2 of Figure 1.

In the drawings the reference numeral 10 indicates a painting of any suitable subject or any suitable tone. Immediately surrounding the picture there is provided a mat 11. In the present illustration the mat is indicated as colored with the color of the sky as at 12. It is to be understood that I may color the mat with more than one color. For example, the upper portion of the mat may be colored to correspond to the color of the sky and the lower portion of the mat may be colored to correspond to the color of the foreground as, for example, the green of the grass. Where two colors are employed they are blended at the point of juncture by intermediate colors to avoid sharp contrast. I find, however, that the most pleasing effect is obtained by coloring the mat with the predominant color of the picture, whether it be that of the sky, foliage, foreground or other part of the picture.

Immediately surrounding the mat 11, I provide a frame 13. On said frame I provide pictorial decorations suggesting the continuation of the picture, and color the frame accordingly. In the picture shown I continue the road 14, for example, on the frame as at 15. As indicated on the top portion of the frame I continue the trees shown in part in the picture. By so decorating the frame there is suggested on the frame the foreground of a scene of which the picture forms the background.

By mounting and framing a painting in a manner as described above I find that the painting is set forth to the best possible advantage for purposes of display. The frame which heretofore has tended to destroy the tone of the picture and to be an eye sore, by my invention appears to form a part of the picture, and a harmony of color and tone between the frame and the picture is produced. The provision of the mat colored as above indicated together with the frame decorated as above described produces an optical illusion whereby the painting appears to be materially larger than its actual size and an effect of pronounced perspective is produced.

While I have employed for the purpose of illustration a landscape it is to be understood that my invention is applicable to any subject desired. Although my invention is particularly adapted to oil paintings, I find that I obtain very pleasing results when employing water colors, pastels, colored lithographs and the like.

It is to be understood that the form of my invention herewith shown and described is to be taken as a preferred example of the same and that various changes in the shape, size, and arrangement of parts may be resorted to without departing from the spirit of the invention or the scope of the subjoined claims.

What I claim is:

1. An article of the class described comprising a colored picture, a frame surrounding but spaced from the picture, said frame being pictorially decorated to represent a continuation of the picture, a mat between the picture and the frame, said mat being colored to correspond with a dominant color appearing in a portion of the picture contiguous thereto.

2. An article of the class described comprising a colored picture, a frame surrounding but spaced from the picture, said frame being pictorially decorated to represent a continuation of the picture, a mat between the picture and the frame, said mat corresponding in color with the predominant color of the picture.

In testimony whereof I affix my signature.

CARTER BALDWIN.